US008891427B2

(12) United States Patent
Dong et al.

(10) Patent No.: US 8,891,427 B2
(45) Date of Patent: Nov. 18, 2014

(54) METHOD AND A SYSTEM FOR PROVIDING MBMS COUNTING

(75) Inventors: Lin Dong, Beijing (CN); Shuguang Yang, Beijing (CN); HuaiShan Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 267 days.

(21) Appl. No.: 13/255,580

(22) PCT Filed: Apr. 24, 2009

(86) PCT No.: PCT/CN2009/000438
§ 371 (c)(1),
(2), (4) Date: Sep. 9, 2011

(87) PCT Pub. No.: WO2010/121398
PCT Pub. Date: Oct. 28, 2010

(65) Prior Publication Data
US 2011/0319011 A1    Dec. 29, 2011

(51) Int. Cl.
*H04L 12/18* (2006.01)
*H04W 28/06* (2009.01)
(Continued)

(52) U.S. Cl.
CPC ............ *H04L 12/189* (2013.01); *H04W 28/06* (2013.01); *H04W 4/06* (2013.01); *H04W 24/10* (2013.01); *H04W 88/12* (2013.01); *H04W 76/02* (2013.01); *Y02B 60/50* (2013.01); *H04W 52/0216* (2013.01); *H04W 28/048* (2013.01)
USPC ........... 370/312; 370/310; 370/432; 455/3.01

(58) Field of Classification Search
CPC ........................ H04L 12/189; H04L 12/5895
USPC ......................... 370/310, 312, 432; 455/3.01
See application file for complete search history.

(56) References Cited

U.S. PATENT DOCUMENTS

| 7,769,010 | B2 * | 8/2010 | Edlund et al. ............. 370/390 |
| 8,310,919 | B2 * | 11/2012 | Worrall ..................... 370/229 |

(Continued)

FOREIGN PATENT DOCUMENTS

| CN | 101150824 | 3/2008 |
| CN | 101155379 | 4/2008 |

(Continued)

OTHER PUBLICATIONS

International Search Report for PCT/CN2009/000438, mailed Feb. 4, 2010.

(Continued)

*Primary Examiner* — Asad Nawaz
*Assistant Examiner* — Berhanu Belete
(74) *Attorney, Agent, or Firm* — Nixon & Vanderhye P.C.

(57) ABSTRACT

A method and a system for implementing a MBMS counting in a wireless communication network environment, wherein a plurality of User Equipments and at least one Radio Network Controller are located in the wireless communication network. The method comprises: confirming a counting response from the UE by means of sending a first message containing a Service ID list and a counting sequence number (CSN) to the UE when the CRNC receives a connection request from the UE; storing the CSN in the UE and starting a timer Tcsn configured in the UE when the UE receives the first message; not responding to a counting when a further CSN and a further Service ID list in a further message received from the CRNC are the same as the CSN and the Service ID list stored in UE and the timer Tcsn does not expire; starting a new counting response by responding to the counting and stopping the timer Tcsn when either the further CSN or the Service ID list in the further message is distinguishing from the CSN and the Service ID list stored in UE and when the timer Tcsn does not expire. According to the method and system of the present invention, the UTRAN radio resource is saved and the UEs consume less power. Meanwhile, the interferences to other users caused by the RRC connection can be avoided.

27 Claims, 4 Drawing Sheets

(51) Int. Cl.
*H04W 4/06* (2009.01)
*H04W 24/10* (2009.01)
*H04W 88/12* (2009.01)
*H04W 76/02* (2009.01)
*H04W 52/02* (2009.01)
*H04W 28/04* (2009.01)

(56) References Cited

U.S. PATENT DOCUMENTS

2004/0229626 A1* 11/2004 Yi et al. .................. 455/450
2005/0090278 A1* 4/2005 Jeong et al. .................. 455/525
2005/0111393 A1* 5/2005 Jeong et al. .................. 370/312
2005/0281209 A1* 12/2005 Cai et al. .................. 370/270
2007/0070972 A1* 3/2007 Wang et al. .................. 370/349
2008/0043658 A1* 2/2008 Worrall .................. 370/312
2009/0022080 A1* 1/2009 Edlund et al. .................. 370/315
2009/0131042 A1* 5/2009 Yi et al. .................. 455/423
2012/0093153 A1* 4/2012 Phan et al. .................. 370/390

FOREIGN PATENT DOCUMENTS

| CN | 101175317 | 5/2008 |
| WO | WO 2007/066982 | 6/2007 |
| WO | WO 2008/037810 | 4/2008 |

OTHER PUBLICATIONS

EPO Communication dated Mar. 28, 2014 in European Application No. EP 09 84 3503.

EPO Communication dated Apr. 15, 2014 in European Application No. EP 09 84 3503.

* cited by examiner

METHOD AND A SYSTEM FOR PROVIDING MBMS COUNTING

This application is the U.S. national phase of International Application No. PCT/CN2009/000438, filed 24 Apr. 2009, the entire contents of which is hereby incorporated by reference.

TECHNICAL FIELD

The present invention relates to the field of mobile radio telecommunication networks. In particular, the present invention relates to a method and a system providing efficient counting in a Multimedia Broadcast Multicast Service (MBMS) environment.

BACKGROUND

With the rapid development of mobile communication technology, mobile communication networks are being extensively used and the number of mobile communication users is increasing sharply. MBMS technology is employed by most of the mobile communication networks.

A MBMS service that provides a broadcasting service to a mobile phone in a Third Generation Partnership Project (3GPP) wireless communication system has been standardized in various groups of the 3GPP.

There exist two transmission modes to provide the MBMS service: point-to-point transmission (p-t-p) and point-to-multipoint transmission (p-t-m).

Generally, point-to-point transmission is used to transfer MEMS specific control/user plane information as well as dedicated control/user plane information between one network and one User Equipment (UE) in a Radio Resource Connection (RRC) Connected Mode. It is only used for the multicast mode of MBMS and for services identified in the list of MBMS Selected Services.

Point-to-multipoint transmission is used to transfer MBMS specific control and/or user plane information between the network and several UEs in RRC Connected or Idle Mode. It is used for broadcast or multicast mode of MBMS.

MBMS Counting is used to determine the optimum transmission mechanism for a given service. The need for counting is indicated in the notification, and achieved by requesting UEs, which belong to the same MEMS service group, to respond to counting by sending MBMS COUNTING RESPONSE signaling flow to a Controlling Radio Network Controller (CRNC). To be specific:

in case the UEs are in idle mode, the counting response refers to a RRC connection establishment procedure;
in case the UEs are in URA_PCH or CELL_PCH state, the counting response refers to a cell update procedure;
in case the UEs are in CELL_FACH state, the counting response refers to a signaling on CCCH or DCCH.

Since it is desirable to avoid bringing a large number of UEs for counting purposes to RRC connection mode in a specific cell at the same time (RACH load, etc), RRM may control the load by setting an access "probability factor".

Upon receiving the MBMS ACCESS INFORMATION message including MBMS service and probability factor a UE has joined or selected, the UE shall start counting response procedure for each joined or selected service:

If the UE is in idle mode, a random number "rand" will be drawn and uniformly distributed in the range: 0<rand<1; if "rand" is lower than the value indicated by "Access probability factor-Idle" for the concerned service, then UE will indicate upper layers that an RRC connection is required to establish so as to receive the concerned MBMS service, meanwhile the establishment cause is set to "MBMS reception"; if the RRC connection establishment and/or cell update succeeds, the procedure ends.

The main purpose of counting is to choose the best transmission mode: p-t-p or p-t-m. Generally, if the number of UE which responds to the counting exceeds a threshold, p-t-m will be adopted; otherwise p-t-p will be adopted.

Normally, the counting procedure will be tried several times. To be specific, the counting procedure firstly starts with a small PF to avoid access congestion. If the threshold is not reached, the PF will be increased and the counting procedure will be tried another time, until the number of counting responses reaches the threshold or the PF reaches "1". Then the decision of transmission mode can be acquired. The detailed description of this procedure is shown in FIG. 1.

FIG. 1 is a flow chart showing a conventional counting process between a CRNC 102 and a UE 100 in a wireless communication system. As shown in FIG. 1, in the conventional counting process, in step S101, a CRNC 102 that manages cells sends a signal to provide an initial access probability factor to UE 100 that is located in the cell and starts a counting or recounting. When receiving the initial access probability factor, UE 100 performs the counting response as indicated in step S102. Furthermore, in case UE 100 is in idle mode, UE 100 will establish a Radio Resource Control (RRC) connection. CRNC 102 receives the response from UE 100 and other UEs, and then calculates the total number of the counting responses, as shown in step 103. Then, in step 104, CRNC 102 will compare the counting response number with a predetermined threshold. If the number of the counting responses is greater than the threshold, which means the number of UEs responding to the counting exceeds the threshold, p-t-m mode will be adopted. This is shown in step S107A. If the number of the counting responses is less than the threshold, the CRNC will further check the probability factor to determine whether the probability factor reaches "1". If the probability factor reaches "1", the procedure goes to step S107B, in which the counting/recounting procedure finishes and p-t-p mode is applied to establish the connection. This represents the situation that only a few UES request the service and p-t-p mode is capable of meeting the requirement of the connection. Turning back to step S105, if the probability factor does not reach "1", the CRNC 102 will updates the probability factor and further forward it to the UEs, as shown in step S106. Then steps S102 to S104/s105 will be repeated until an optimum connection mode is determined.

However, there are problems with the above illustrated solutions. To be specific, in case UE 100 is in idle mode, the CRNC and those UEs which respond to the counting will hold the RRC connection therebetween uninterruptedly until the whole counting period finishes. If the decision is adopting p-t-m mode, those RRC connection will be released by CRNC. In this regard, the following problems appear: the radio resource is occupied but not utilized for a long time, which results in the waste of UMTS Terrestrial Radio Access Network (UTRAN) radio resource (such as code resource, transport resource and DL power); since the connection lasts to the end of the counting period, UEs will consume more power, which results in the waste of power; and the RRC connection also causes interferences to other users.

Accordingly, it would be desirable to provide a method and a system for providing an efficient counting in a MEMS environment to overcome the above disadvantages.

SUMMARY

Therefore, it is one object of the present invention to address the above disadvantages by providing a method of and a system for implementing the MEMS counting in a communication network to improve the efficiency of utilizing the radio resource.

According to one aspect of the invention, there is provided a method for implementing the MBMS counting in a wireless communication network environment, wherein a plurality of UEs and at least one Controlling Radio Network Controller (CRNC) are located in the wireless communication network. The method comprises: confirming a counting response from the UE by means of sending a first message containing a Service ID list and a counting sequence number (CSN) to the UE when the CRNC receives a connection request from the UE; storing the CSN in the UE and starting a timer Tcsn configured in the UE when the UE receives the first message; not responding to a counting when a further CSN and a further Service ID list in a further message received from the CRNC are the same as the CSN and the Service ID list stored in UE and the timer Tcsn does not expire; starting a new counting response by responding to the counting and stopping the timer Tcsn when either the further CSN or the further Service ID list in the further message is distinguishing from the CSN and the Service ID list stored in UE and when the timer Tcsn does not expire.

According to one aspect of the above described embodiments, the method further comprises setting a threshold in the CRNC to judge whether selecting the point-to-point mode or selecting the point-to-multipoint mode; and setting an initial probability factor and a CSN in the CRNC and forwarding them from the CRNC to the UE.

According to one aspect of the above described embodiments, the method further comprises generating a connection request on the basis of the initial probability factor in the UE; and sending the connection request to the CRNC from the UE.

According to one aspect of the above described embodiments, the method further comprises counting the number of counting responses by a counter configured in the CRNC; comparing the number of responses with the threshold if the timer Tpf expires; updating the probability factor if the number of response does not reach the threshold; and forwarding a further message containing the updated probability factor and the further CSN from the CRNC to the UE.

According to one aspect of the above described embodiments, the method further comprises applying a point-to-point mode if the number of counting responses does not reach the threshold; and applying a point-to-multipoint mode if the number of counting responses reaches the threshold.

According to one aspect of the above described embodiments, if the timer Tcsn expires, the CSN stored in the UE is cleared.

According to one aspect of the above described embodiments, if the further CSN or the further Service ID list is different from the CSN and the Service ID list stored in the UE, the new counting response is started on the basis of the further CSN.

According to another aspect of the invention, there is provided a system for implementing the MBMS counting in a wireless communication network environment, wherein a plurality of UEs and at least one CRNC are located in the wireless communication network. The system comprises a first processing unit configured in the CRNC for confirming a counting response from UE by means of sending a first message containing a Service ID list and a CSN to the UE when the CRNC receives a connection request from the UE; a second processing unit configured in the UE for storing the CSN and the Service ID list and starting a timer Tcsn configured in the UE when the UE receives the first message; a determining unit configured in the CRNC for judging whether selecting the p-t-p mode or selecting the p-t-m mode.

According to one aspect of the above described embodiments, the second processing unit determines not to respond to a counting when a further CSN and a further Service ID list in a further message received from the CRNC are the same as the CSN and the Service ID list stored in UE and when the timer Tcsn does not expire; and the second processing unit determines to start a new counting response by responding to the counting and to stop the timer Tcsn when either the further CSN or the further Service ID list in the further message is distinguishing from the CSN and the Service ID list stored in the UE and when the timer Tcsn does not expire.

According to one aspect of the above described embodiments, the first processing unit is configured to set a threshold which is used to judge whether selecting the point-to-point mode or selecting the point-to-multipoint mode.

According to one aspect of the above described embodiments, wherein the first processing unit is configured to set an initial probability factor and a counting sequence number in the CRNC and further forward them from the CRNC to the UE According to one aspect of the above described embodiments, the system further comprises a generating unit configured in the UE for generating a connection request on the basis of the initial probability factor.

According to one aspect of the above described embodiment, the system further comprises a counter configured in the CRNC for counting the number of responses.

According to one aspect of the above described embodiment, the determining unit determines to apply the point-to-point mode when the number of responses does not reach the threshold, and determines to apply the point-to-multipoint mode when the threshold is reached by the number of responses.

According to one aspect of the above described embodiment, the second processing unit clears the CSN stored in the UE when the timer Tcsn expires.

According to one aspect of the above described embodiment, if the further CSN or the further Service ID list is different from the CSN and the Service ID list stored in the UE, the new counting response is started on the basis of the further CSN.

According to yet another aspect of the invention there is provided a UMTS Terrestrial Radio Access Network comprising a communication system as described above.

According to yet another aspect of the invention there is provided a communication system for providing MBMS over a communication network comprising a core network and a UTRAN as described above.

According to yet another aspect of the invention there is provided a computer readable medium including logic for implementing the MBMS counting in a wireless communication network environment, wherein a plurality of UEs and at least one CRNC are located in the wireless communication network. The logic is operable to: confirm a counting response from UE by means of sending a first message containing a Service ID list and a CSN to the UE when the CRNC receives a connection request from the UE; store the CSN in the UE and start a timer Tcsn configured in the UE when the UE receives the first message; not respond to the counting when a further CSN and a further Service ID list in a further message received from the CRNC are the same as the CSN and the Service ID list stored in UE and when the timer Tcsn does not expire; start a new counting response by respond to the counting and further stop the timer Tcsn when either the further CSN or the further Service ID list in the further message is distinguishing from the local value in UE and when the timer Tcsn does not expire.

According to yet another aspect of the invention there is provided a machine-readable medium, storing instructions, which when executed perform the aforesaid method.

The method and system according to the present invention does not need to hold the RRC connection on DCH during a whole period and therefore the UTRAN radio resource is saved. Furthermore, since it is unnecessary for the UE to keep the RRC connection, the UEs consumes less power. Meanwhile, the interferences to other users caused by the RRC connection can be avoided.

BRIEF DESCRIPTION OF THE DRAWINGS

The above and other aspects, features and advantages of the present invention will be more apparent from the following more particular description thereof, presented in conjunction with the accompanying drawings, in which.

Corresponding reference characters indicate corresponding components throughout the several views of the drawings.

DETAILED DESCRIPTION

The embodiments set forth below represent the necessary information to enable those skilled in the art to practice the invention and illustrate the best mode of the practicing the invention. Upon reading the following description in light of the accompanying drawing figures, those skilled in the art should understand the concepts of the invention and will recognize applications of these concepts not particularly addressed herein.

It should be understood that these concepts and applications fall within the scope of the disclosure and the accompanying claims.

Throughout the description and claims of this specification, the terminology "UE" includes, but is not limited to, a user equipment; term "MBMS" includes but is not limited to multimedia broadcast multicast service; term "CRNC" includes but is not limited to controlling radio network controller; term "PF" includes but is not limited to probability factor; term "RRC" includes but is not limited to radio resource connection; term "UTRAN" includes but is not limited to a UMTS Terrestrial Radio Access Network; term "UMTS" includes but is not limited to universal mobile telecommunication system; term "CSN" includes but is not limited to counting sequence number.

Figure 1:
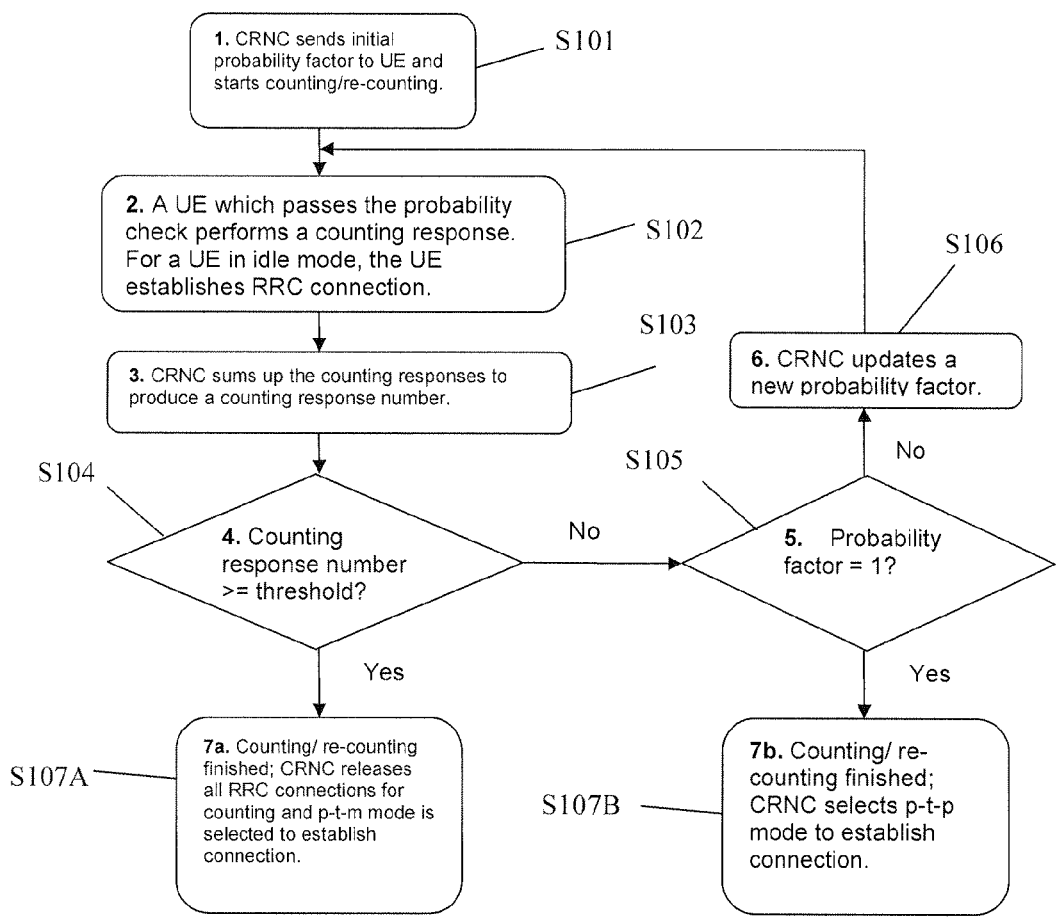
FIG. 1 is a flow chart showing a conventional counting process between a CRNC and a UE in a wireless communication system.
Figure 2:
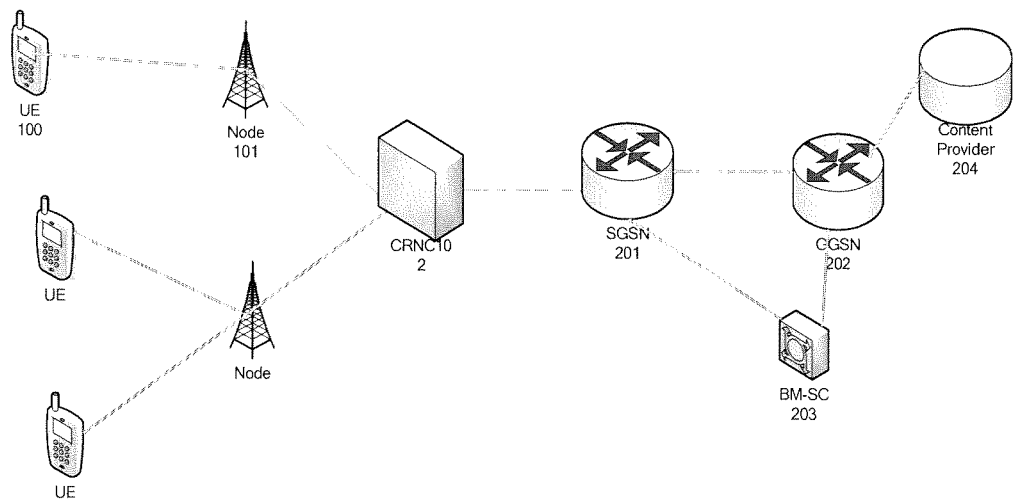
FIG. 2 is a schematic view illustrating a simplified system architecture of a MBMS system.

FIG. 2 is a schematic view showing a simplified network architecture of a mobile radio telecommunication network according to an exemplary embodiment of the present invention, including at least one CRNC 102 and at least one UE 100 according to the present invention.

As shown in FIG. 2, a 3GPP wireless communication system is provided according to an exemplary embodiment of the present invention, and includes one broadcast and multicast-service center (BM-SC) 203, one gateway general packet radio service support node (GGSN) 202, one serving general packet radio service support node (SGSN) 201, CRNC 102, and one Node 101. GGSN 202, SGSN 201, CRNC 102, Node 101, and BM-SC 203 are connected with each other through a wired link.

In addition, UE 100 accesses Node 101 through a wireless link and receives an MEMS from the BM-SC 203. The BM-SC 203 is a center providing an MEMS to UE 100.

The GGSN 202 manages a plurality of SGSNs 201, manages sessions of packets received from the plurality of SGSNs 201, and manages mobility of UE 100 as a gateway node of the 3GPP network, and SGSN 201 processes a received packet call that matches CRNC 102, manages a session, and manages mobility of UE 100.

CRNC 102 controls Node 101, determines whether Node 101 uses an MBMS by using a sequence detected from Node 101, and performs an MBMS counting process according to whether Node 101 uses the MBMS. In addition, CRNC 102 includes a storage module for storing counting information on the basis of the MBMS counting process.

Node 101 is connected with UE 100 through a wireless link and connected with CRNC 102 through a wired link, and provides UE 100 with MBMS information received through the wired link.

In addition, Node 101 receives a random access preamble from UE 100, and detects a pseudo noise (PN) sequence, a signature sequence, or a gold sequence from the received random access preamble according to sequence information predetermined by a network manager.

The above is only a brief introduction regarding a MBMS environment, more detailed description will be given below in conjunction with FIGS. 3 and 4.

Figure 3:
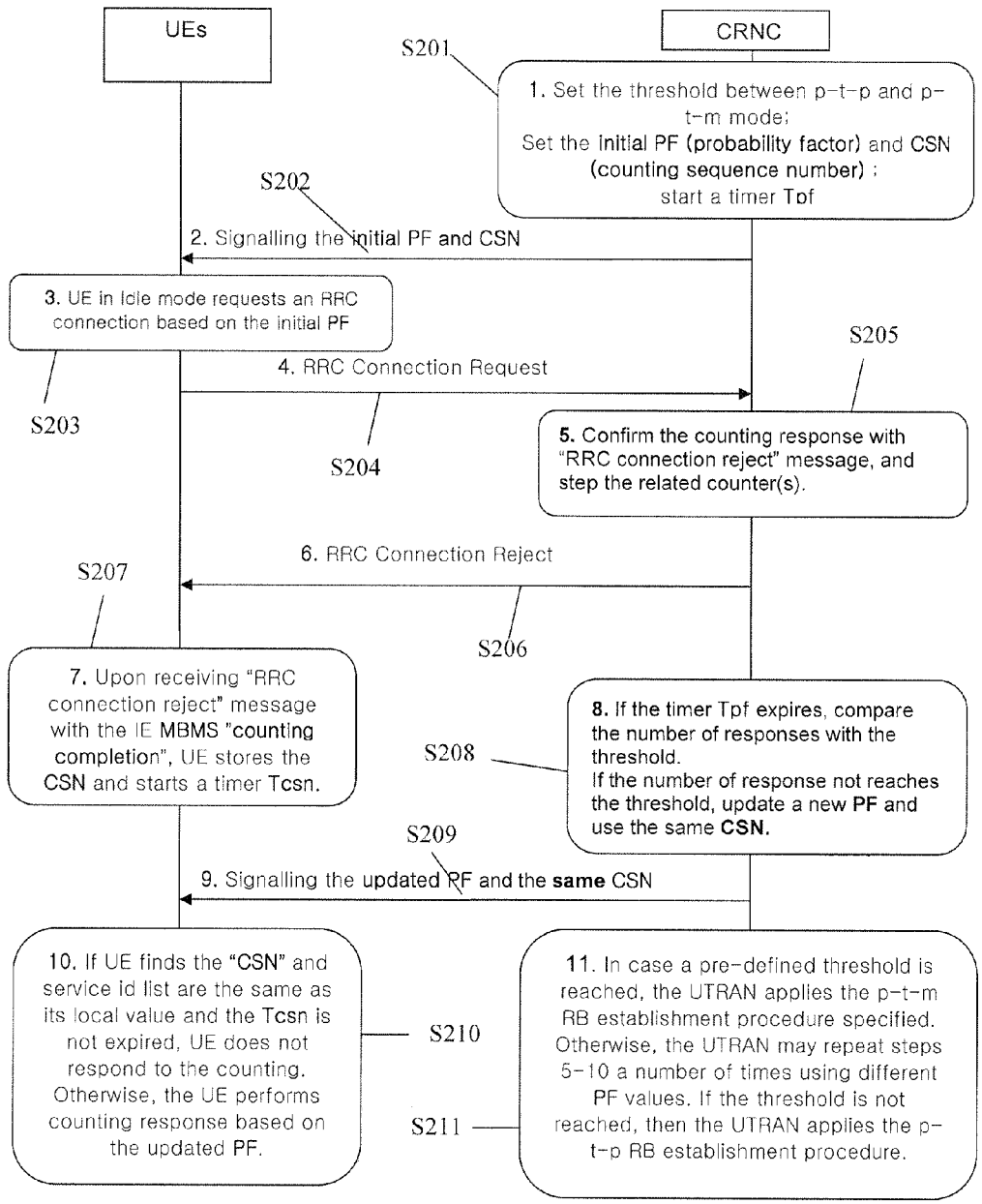
FIG. 3 represents the counting method according to one embodiment of the present invention.

As is shown in FIG. 3, firstly in step S201, CRNC 102 sets the threshold that is used for determining to adopt p-t-p mode or p-t-m mode and further sets the initial PF and CSN. Simultaneously a timer Tpf is started. Herein, CSN is a new introduced in message "MBMS ACCESS INFORMATION". CSN remains unchanged during one whole counting period. Then CRNC 102 sends signals containing the initial PF and CSN to UE 101 (S202). Upon receiving the PF and CSN, UE 101 in idle mode will file a request to establish a RRC connection on the basis of the PF in steps S203 and S204.

As is illustrated in step S205, when CRNC 102 receives the RRC connection Request from UE 100, firstly CRNC 102 send a message RRC CONNECTION REJECT to UE 100 to confirm the reception of the RRC connection Request. UE 100 will treat the reception of RRC CONNECTION REJECT with the IE MBMS "counting completion" as the success of counting response procedure.

Meanwhile, the counter 304 steps and the number of responses is added by "1". After that CRNC 102 will check timer Tpf 307 to judge whether it expires or not. If timer Tpf 307 does not expire, the CRNC 102 will not compare the number of responses with the predetermined threshold. If timer Tpf 307 expires, CRNC 102 compares the number of responses with the predetermined threshold to determine whether the number of responses reaches the threshold or not.

If the number of responses does not reach the threshold, CRNC 102 updates the PF and sends the new PF and the same CSN to UE 100.

If the number of responses reaches the threshold, in other words, the number of responses is greater than the threshold, which means there are already enough UEs in the cell that file RRC Connection Requests, in this regard, UTRAN will determine to adopt p-t-m mode to perform the wireless communication.

On the UE's side, in step S207, UE 100 will store the CSN and starts a timer Tcsn 306 upon receiving the "RRC CON- NECTION REJECT" message with the IE MBMS "counting completion", UE will store the CSN and start a timer Tcsn Tcsn 306.

Meanwhile, as more and more UEs requesting the same service may responds to the counting, the number of the responses increases.

As soon as the PF is updated, CRNC 102 will send the updated PF and the CSN to the UEs, wherein each CSN corresponds to each Service ID list. In fact, after CRNC 102 confirms the counting response from UE 100, UE 100 may still receive further CSNs together with the updated PFs from CRNC 102. This is shown in step S209.

After receiving a further CSN and updated PF, the UE will at first compare the further received CSN with the CSN stored locally.

If the timer Tcsn 306 expires, the locally stored CSN will be cleared. Hence, if the timer Tcsn expires, the result of the comparison is that the further received CSN is different from the CSN stored locally.

If the Service ID list changes, UE 100 will also finds that the locally stored CSN differs from the further received CSN since each CSN corresponds to a Service ID list.

Under the above two situations, because the CSN changes, the current counting period stops and UE 100 will perform a new counting response on the basis of the new CSN and updated PF received in step S209.

Turning back to step S210, if the further received CSN and Service ID list are the same as the locally stored values, and furthermore the timer Tcsn 306 does not expire, UE 100 will not perform the response to the counting since UE 100 has already responded to the counting in steps S204 for the same Service ID list.

As for CRNC 102, with the increasing of PF, steps S205 to S210 will be repeated until the threshold is reached or PF reaches "1". Finally, if the threshold is not reached but the PF increases to "1", the UTRAN will employ the p-t-p mode to perform the transmission; if the threshold is reached, then p-t-p mode to will be adopted to perform the transmission.

Figure 4:
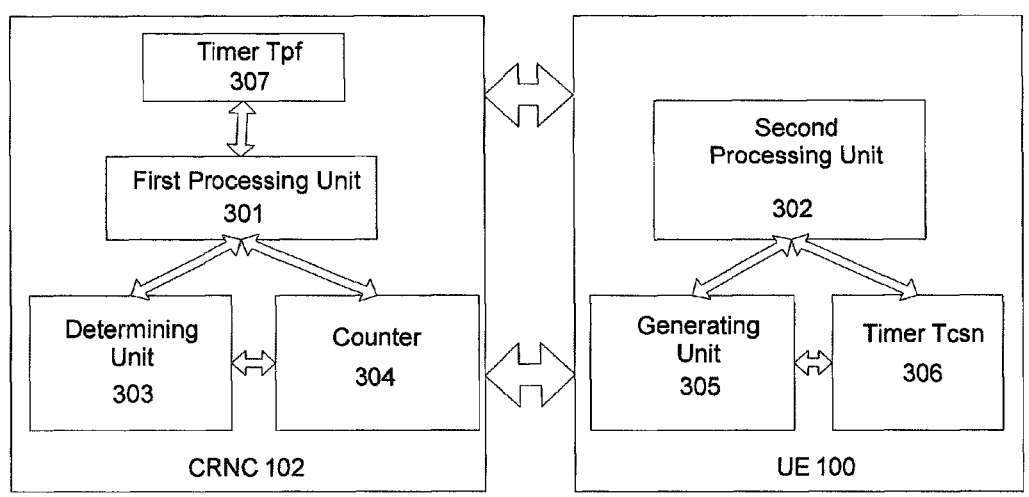
FIG. 4 shows a corresponding configuration for implementing the method as shown in FIG. 3.

FIG. 4 illustrates a simplified architecture of the system for implementing the above described method.

As is shown, a first processing unit 301, a determining unit 303 and a counter 304 as well as a timer Tpf 307 are configured in CRNC 102, while a second processing unit 302, a generating unit 305 and a timer Tcsn 306 are configured in UE 100.

UE 100 will treat reception of RRC CONNECTION REJECT with the IE MBMS "counting completion" as the success of counting response procedure. If UE 100 has successful performed the counting response, UE 100 will store the CSN for those Service ID list and start a timer Tcsn Tcsn 306.

When receiving the MBMS access information message with the same Service ID list and CSN, and if the Tcsn 306 does not expire, UE 100 will not perform any counting. When receiving the MBMS ACCESS INFORMATION message with the same Service ID list but different CSN, UE 100 will stop the timer Tcsn Tcsn 306 if it doesn't expire and start new MBMS counting response based on the PF.

CRNC 102 configures a CSN for each MBMS Service ID list and keeps this CSN unchanged during one counting period.

When starting a new counting period or the content changed in IE "Service ID list", a different, new CSN will be employed.

Upon receiving the RRC request with cause "MBMS reception", CRNC 102 counts the specified MBMS service, then sends RRC CONNECTION REJECT message with IE MEMS "counting completion" to UE 100 to confirm the success of the counting procedure.

The first processing unit 301 is used for confirming the counting response by sending message "RRC CONNECTION REJECT" containing a Service ID list and a CSN to UE 100 when CRNC 102 receives a connection request from UE 100. Determining unit 303 configured in CRNC 102 is used for the judgement of adopting the p-t-p mode or the p-t-m mode. The first processing unit 301 is configured to set a threshold in the CRNC to judge whether selecting the point-to-point mode or selecting the point-to-multipoint mode. The first processing unit 301 is further configured to set an initial probability factor and to generate a CSN and further to forward them from CRNC 102 to UE 100.

Counter 304 configured in the CRNC (102) is used for counting the number of responses.

Determining unit 303 determines to apply the point-to-point mode when the threshold is not reached by the number of responses; and determines to apply the point-to-multipoint mode when the threshold is reached by the number of responses.

Timer Tpf 307 configured in CRNC 102 is used to judge whether to perform the comparison of number of responses and the predetermined threshold or not. If timer Tpf 307 expires, the comparison will be performed; otherwise the comparison will not be performed.

The second processing unit 302 configured in UE 100 is used for storing the CSN and starting timer Tcsn 306 configured in UE 100 when UE 100 receives the first message. The second processing unit 302 determines not to respond the counting when a further CSN and a further Service ID list in a further message received from CRNC 102 are the same as the local value stored in UE 100 and when the timer Tcsn (306) does not expire. The second processing unit 303 further determines to start a new counting response by responding to the counting and to stop timer Tcsn (306) when either the further CSN or the further Service ID list in the further received message is distinguishing from the local value in UE 100 and when the timer Tcsn 306 does not expire.

Generating unit 305 configured in the UE for generating a connection request on the basis of the initial probability factor in the UE.

Second processing unit 302 clears the CSN stored in UE 100 when timer Tcsn 306 expires.

If the CSN or Service ID list is different from the local value, UE 100 starts the new counting response on the basis of the new CSN.

It should be understood that the one or more of First processing unit 301, second processing unit 302, determining unit 303, counter 304, generating unit 305 and timer Tcsn 306 may comprise hardware, software, or any combination thereof. In at least one embodiment, these portions include instructions to carry out operations corresponding to the method steps as discussed above. Such instructions may be embodied as one or more computer programs comprising stored program instructions in a storage element (e.g., memory).

It should also be understood that the embodiments are described on the basis of just one example in a MBMS environment. The core of the invention, being the new counting procedure, can however be applied in enforcements of all kind of policies not limited to MBMS.

Throughout the description and claims of this specification, the words "comprise", "include", and variations of the words, for example "comprising" and "comprises", means "including but not limited to", and is not intended to (and does not) exclude other components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

It will be understood that the foregoing description of the embodiments of the invention has been presented for purposes of illustration and description. This description is not exhaustive and does not limit the claimed invention to the precise forms disclosed. Modifications and variations are possible in light of the above description or may be acquired from practicing the invention. The claims and their equivalents define the scope of the invention.

The invention claimed is:

1. A method for implementing multimedia broadcast multicast service (MBMS) counting in a wireless communication network environment, wherein a plurality of User Equipments (UEs) and at least one Radio Network Controller (CRNC) are located in the wireless communication network, the method comprising:
    setting an initial probability factor and a counting sequence number in the CRNC and forwarding the probability factor and the counting sequence number from the CRNC to the UE;
    the CRNC confirming a counting response from one of the UEs by sending a first message containing a Service ID list and a counting sequence number to the UE when the CRNC receives a connection request from the UE, where the first message is a connection resect message, the UE storing the counting sequence number and starting a first timer configured in the UE when the UE receives the first message;
    determining whether to select an MBMS point-to-point mode or to select an MBMS point-to-multipoint mode;
    the UE not responding to a further counting message received from the CRNC when a further counting sequence number and a further Service ID list in the further counting message are the same as the counting sequence number and the Service ID list stored in UE and when the first timer has not expired;
    the UE providing a new counting response by responding to the further counting message and stopping the first timer when either the further counting sequence number or the further Service ID list in the further counting message differs from the counting sequence number or the Service ID list stored in UE, respectively, and when the first timer has not expired.

2. The method as defined in claim 1, further comprising:
    setting a threshold in the CRNC to judge whether to select an MBMS point-to-point mode or to select an MBMS point-to-multipoint mode; and
    starting a second timer configured in the CRNC.

3. The method as defined in claim 2, further comprising:
    generating a connection request on the basis of the initial probability factor in the UE; and
    sending the connection request to the CRNC from the UE.

4. The method as defined in claim 1, further comprising:
    counting the number of counting responses by a counter configured in the CRNC.

5. The method as defined in claim 2, further comprising:
    comparing the number of counting responses with the threshold if the second timer expires;
    updating the probability factor if the number of response does not reach the threshold; and
    forwarding a further message containing the updated probability factor and the counting sequence number from the CRNC to the UE.

6. The method as defined in claim 2, further comprising:
    applying the MBMS point-to-point mode if the number of responses does not reach the threshold; and
    applying the MBMS point-to-multipoint mode if the number of responses reaches the threshold.

7. The method as defined in claim 1, wherein if the first timer expires, the counting sequence number stored in the UE is cleared.

8. The method as defined in claim 1, if the further counting sequence number or the further Service ID list is different from the counting sequence number or the Service ID list stored in the UE, the new counting response is started on the basis of the further counting sequence number.

9. A system for implementing MBMS counting in a wireless communication network environment, wherein a plurality of User Equipments (UEs) and at least one Controlling Radio Network Controller (CRNC) are located in the wireless communication network, the system comprising:
    a first processor configured in the CRNC to set an initial probability factor and a counting sequence number in the CRNC and further forward the initial probability factor and the counting sequence number from the CRNC to the UE and to confirm a counting response from one of the UEs by sending a first message containing a Service ID list and a counting sequence number to the UE when the CRNC receives a connection request from the UE, where the first message is a connection reject message;
    a second processor configured in the UE to store a counting sequence number or the Service ID list and starting a first timer configured in the UE when the UE receives the first message;
    determining circuitry configured in the CRNC to judge whether to select an MBMS point-to-point mode or to select an MBMS point-to-multipoint mode;
    wherein the second processor is configured to not respond to a further counting message when a further counting sequence number and a further Service ID list in the further counting message received from the CRNC are the same as the counting sequence number and the Service ID list stored in UE and when the first timer has not expired, and
    wherein the second processor is configured to generate a new counting response in response to the further counting message and to stop the first timer when either the further counting sequence number or the further Service ID list in the further counting message differs from the counting sequence number and the Service ID list stored in the UE and when the first timer has not expired.

10. The system as defined in claim 9, wherein the first processor is configured to set a threshold which is used to judge whether to select an MBMS point-to-point mode or to select an MBMS point-to-multipoint mode.

11. The system as defined in claim 9, further comprising a generating unit configured in the UE for generating a connection request on the basis of the initial probability factor.

12. The system as defined in claim 9, further comprising a counter configured in the CRNC for counting the number of responses.

13. The system as defined in claim 10, further comprising a second timer configured in the CRNC used for judging whether to compare the number of responses with the threshold or not.

14. The system as defined in claim 10, wherein the determining is configured to select the MBMS point-to-point mode when the number of responses does not reach the threshold, and to select the MBMS point-to-multipoint mode when the threshold is reached by the number of responses.

15. The system as defined in claims 9, wherein the second processor is configured to clear the counting sequence number stored in the UE when the first timer expires.

16. The system as defined in claim 9, wherein if the further counting sequence number or the further Service ID list is different from the counting sequence number or the Service ID list stored in the UE, the new counting response is started on the basis of the further counting sequence number.

17. A UMTS Terrestrial Radio Access Network (UTRAN) comprising a system as defined in claim 9.

18. A communication system for providing Multimedia Broadcast Multicast Service over a communication network comprising a core network and a UTRAN as defined in claim 17.

19. A user equipment (UE) for implementing a MBMS counting in a wireless communication network environment, the UE comprising:
   generating circuitry configured to generate a connection request on the basis of an initial probability factor;
   a timer configured to start when the UE receives a first message containing a Service ID list and a counting sequence number from a controlling radio network controller (CRNC) that determines whether to select an MBMS point-to-point mode or to select an MBMS point-to-multipoint mode, where the first message is a connection reject message and the CRNC; and
   a processor configured to:
   store the counting sequence number or Service ID list from the first message;
   determine not to respond to a further counting message when a further counting sequence number and a further Service ID list in the further counting message received from the CRNC are the same as the stored counting sequence number and the Service ID list and when the timer has not expired, and
   determine to initiate a new counting response by responding to the counting and to stop the timer when either the further counting sequence number or the further Service ID list in the further counting message differs from the counting sequence number and the Service ID list stored in the processor and when the timer has not expired.

20. The UE as defined in claims 19, wherein the processor is configured to clear the counting sequence number stored in the processor when the timer expires.

21. The UE as defined in claim 19, if the further counting sequence number or the further Service ID list is different from the counting sequence number or the Service ID list stored in the processor, then the processor is configured to start the new counting response on the basis of the further counting sequence number.

22. A Controlling Radio Network Controller (CRNC) for implementing a MBMS counting in a wireless communication network environment, the CRNC comprising:
   a processor configured to set an initial probability factor and a counting sequence number in the CRNC, to forward the initial probability factor and the counting sequence number from the CRNC to the UE, and to confirm a counting response from one or more user equipments (UEs) by sending an Radio Resource Control (RRC) Connection Reject message containing a Service ID list and the counting sequence number to the user equipment when the CRNC receives a connection request from the UE; and
   determining circuitry configured to judge whether to select an MBMS point-to-point mode or to select an MBMS point-to-multipoint mode,
   the CRNC configured to send a further counting message to the UE which the UE will not respond to when a further counting sequence number and a further Service ID list in the further counting message are the same as the counting sequence number and the Service ID list stored in UE and when the first timer has not expired;
   the CRNC configured to receive a new counting response from the UE, in response to the further counting message, which occurs when the UE stops the first timer when either the further counting sequence number or the further Service ID list in the further counting message differs from the counting sequence number or the Service ID list stored in UE, respectively, and when the first timer has not expired.

23. The CRNC as defined in claim 22, wherein the processor is configured to set a threshold which is used to judge whether selecting the point-to-point mode or selecting the point-to-multipoint mode.

24. The CRNC as defined in claim 22, further comprising a counter for counting the number of responses.

25. The CRNC as defined in claim 23, further comprising a timer for judging whether to compare the number of responses with the threshold or not.

26. The CRNC as defined in claim 25, wherein the determining circuitry is configured to determine to apply the point-to-point mode when the number of responses does not reach the threshold and to apply the point-to-multipoint mode when the threshold is reached by the number of responses.

27. The CRNC as defined in claim 22, wherein if a further counting sequence number or a further Service ID list is different from the counting sequence number or the Service ID list stored in the UE, the processor is configured to start a new counting response on the basis of the further counting sequence number.

* * * * *

UNITED STATES PATENT AND TRADEMARK OFFICE
CERTIFICATE OF CORRECTION

| | | |
|---|---|---|
| PATENT NO. | : 8,891,427 B2 | Page 1 of 1 |
| APPLICATION NO. | : 13/255580 | |
| DATED | : November 18, 2014 | |
| INVENTOR(S) | : Dong et al. | |

It is certified that error appears in the above-identified patent and that said Letters Patent is hereby corrected as shown below:

In the specification,

In Column 1, Line 32, delete "MEMS" and insert -- MBMS --, therefor.

In Column 1, Line 46, delete "MEMS" and insert -- MBMS --, therefor.

In Column 2, Line 61, delete "MEMS" and insert -- MBMS --, therefor.

In Column 3, Line 1, delete "MEMS" and insert -- MBMS --, therefor.

In Column 6, Line 6, delete "MEMS" and insert -- MBMS --, therefor.

In Column 6, Line 7, delete "MEMS" and insert -- MBMS --, therefor.

In Column 8, Line 1, delete "MEMS" and insert -- MBMS --, therefor.

In the claims,

In Column 9, Line 21, in Claim 1, delete "Radio" and insert -- Controlling Radio --, therefor.

In Column 9, Line 32, in Claim 1, delete "resect" and insert -- reject --, therefor.

In Column 11, Line 6, in Claim 15, delete "claims 9," and insert -- claim 9, --, therefor.

Signed and Sealed this
Fifteenth Day of March, 2016

Michelle K. Lee
*Director of the United States Patent and Trademark Office*